G. R. WARD.
BREAD WRAPPING MACHINE.
APPLICATION FILED MAR. 29, 1912.
1,094,614.
Patented Apr. 28, 1914.
12 SHEETS—SHEET 9.
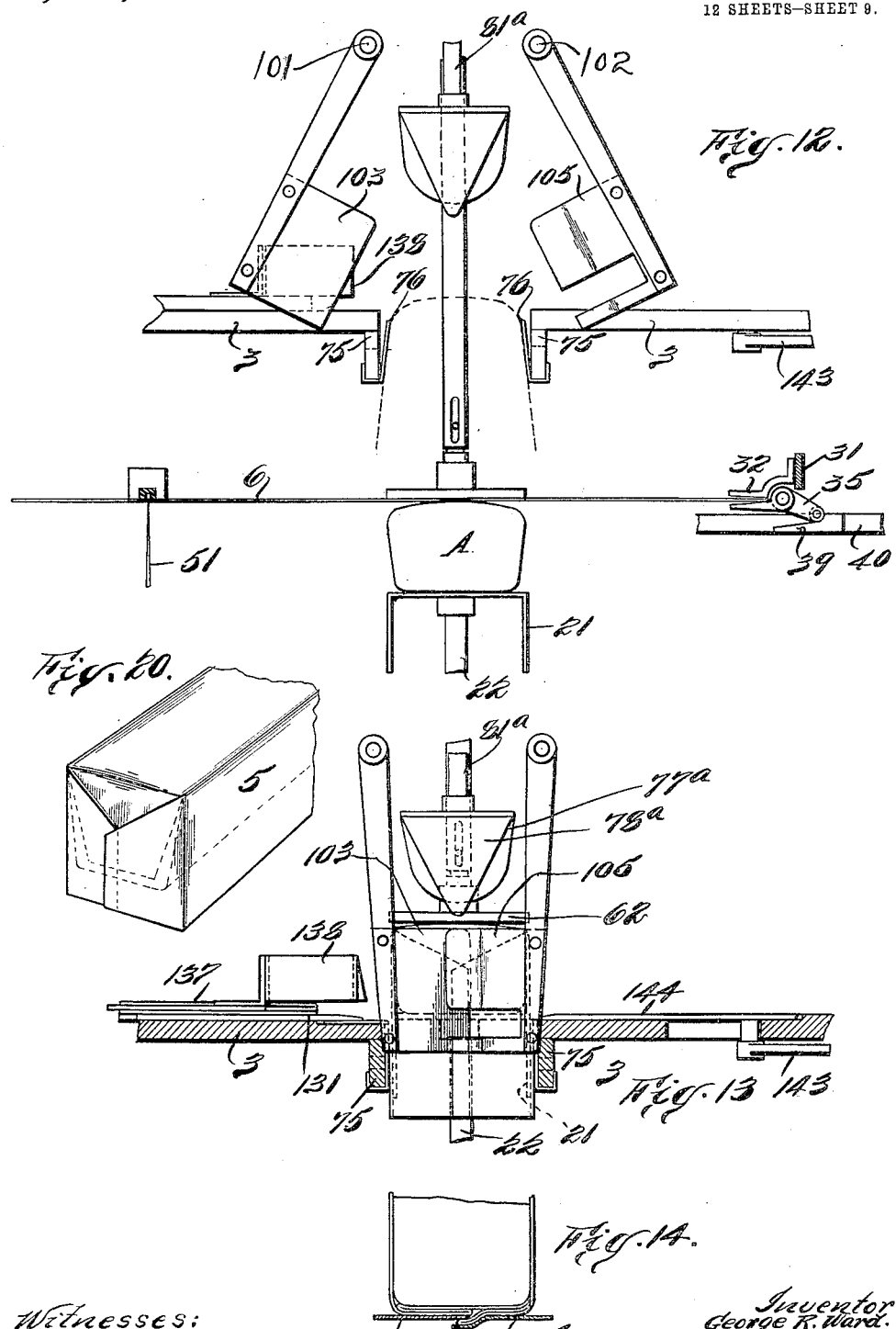
Witnesses:
C. A. Jarvis
A. Bernstein
Inventor:
George R. Ward
Newell Neal
attorneys

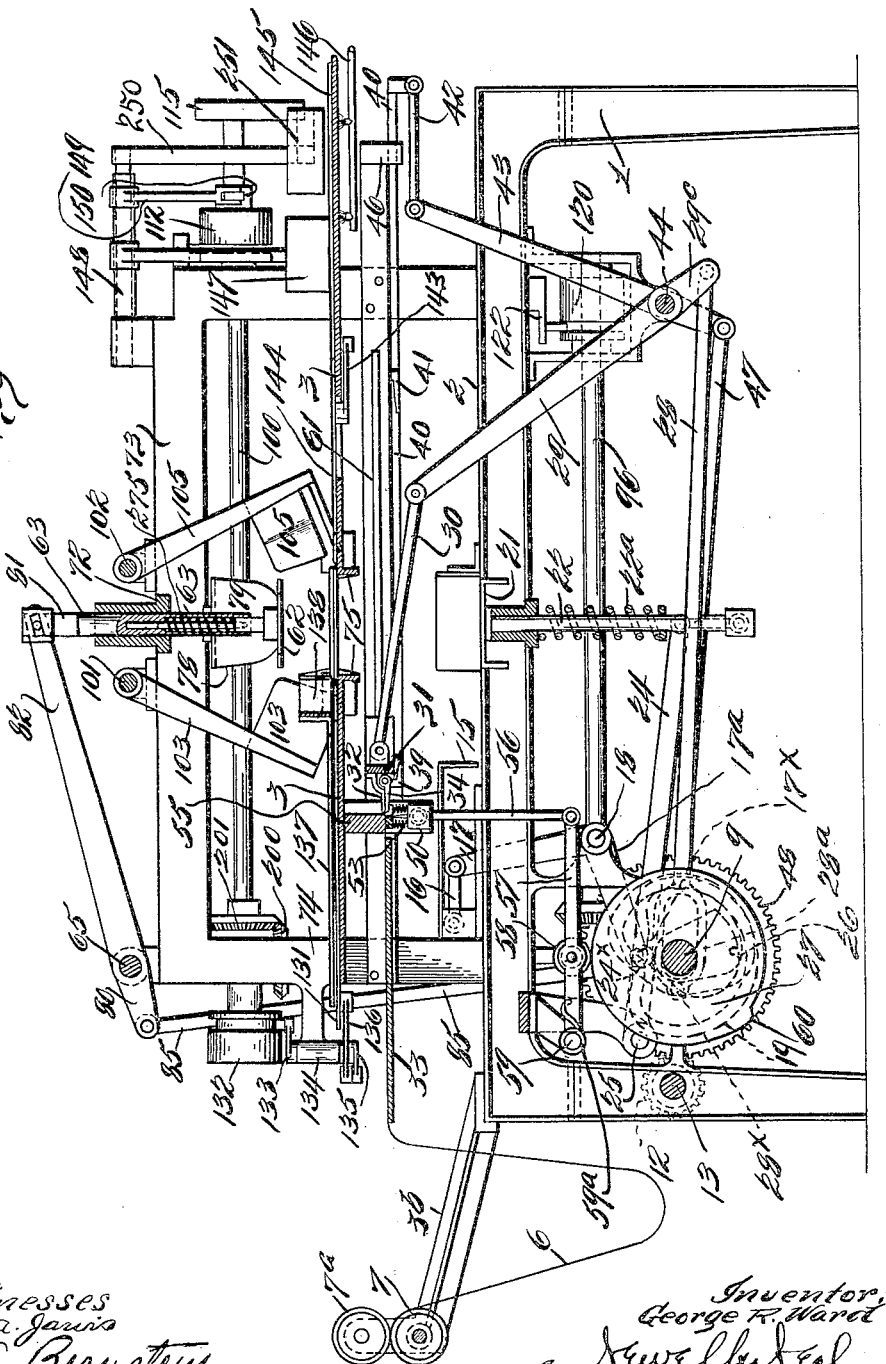

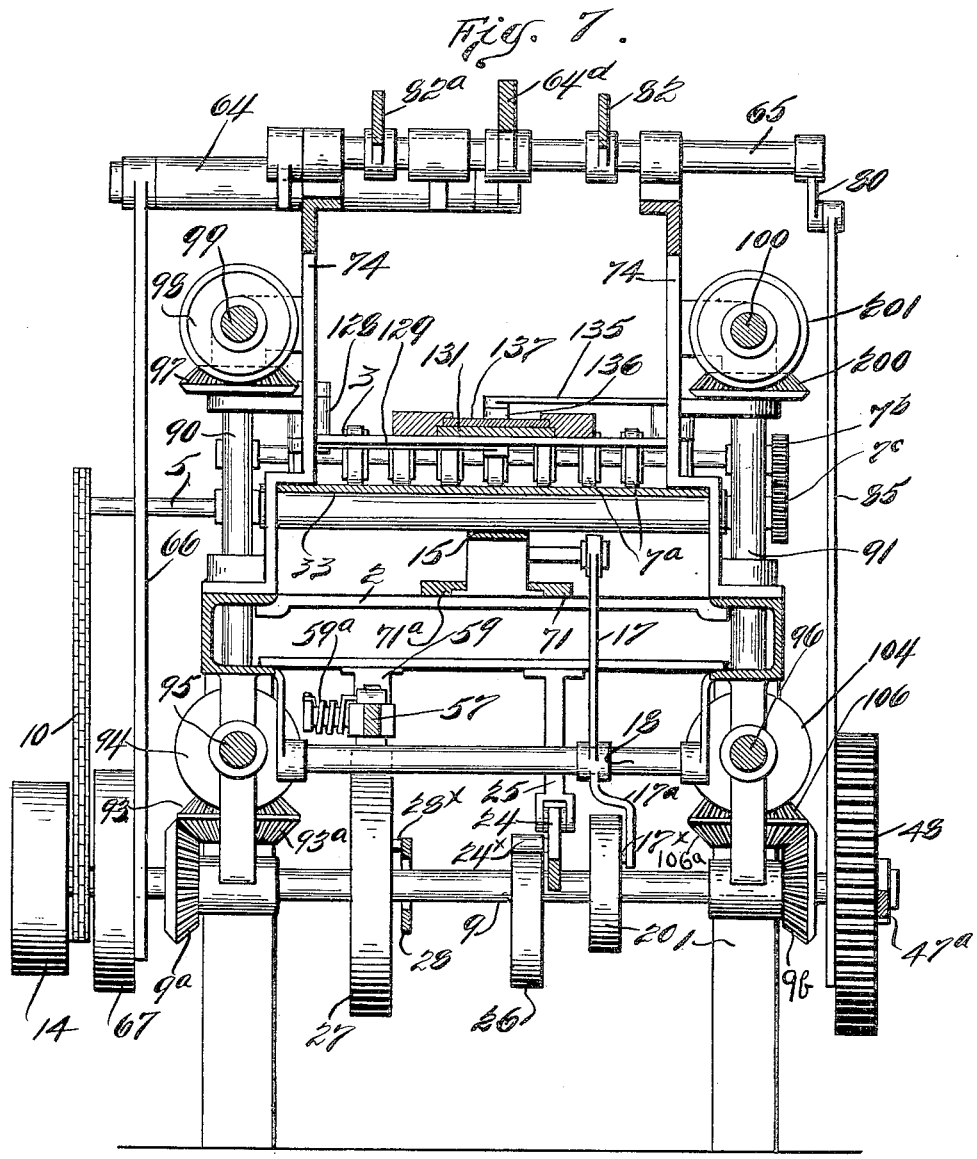

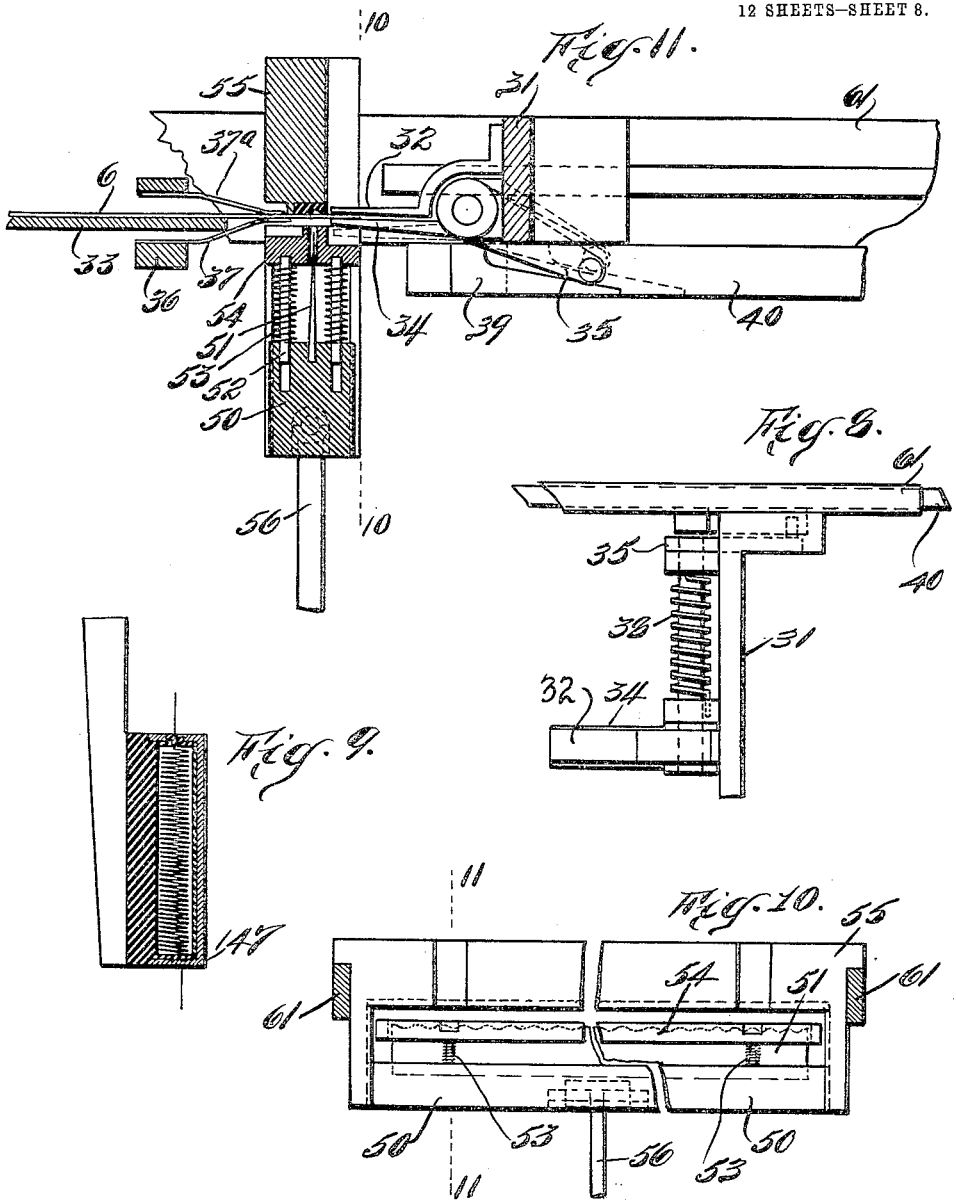

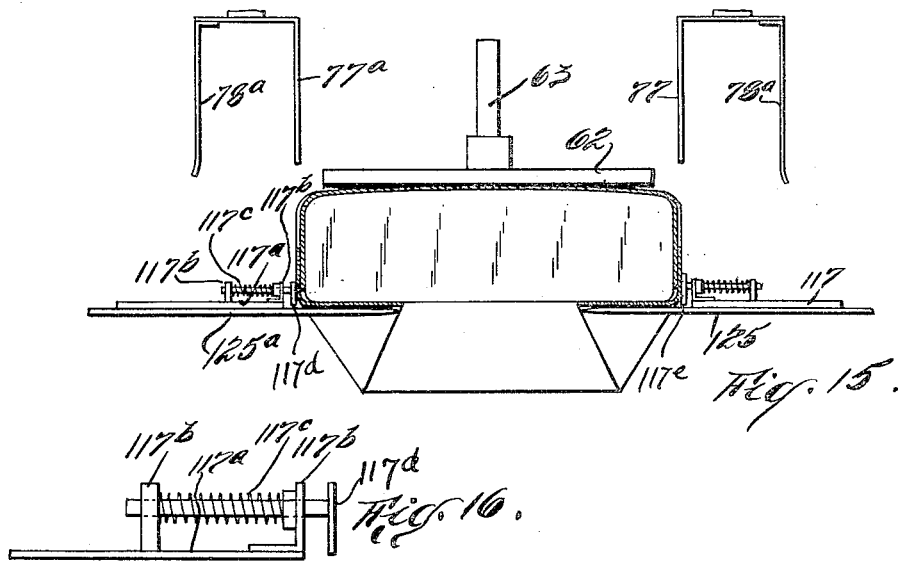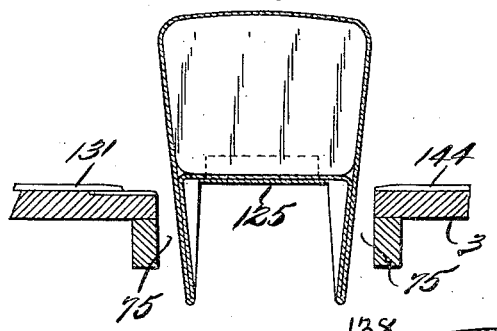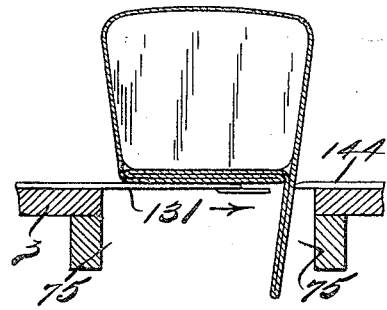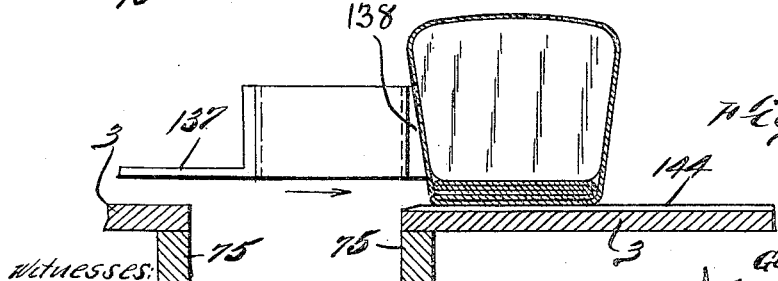

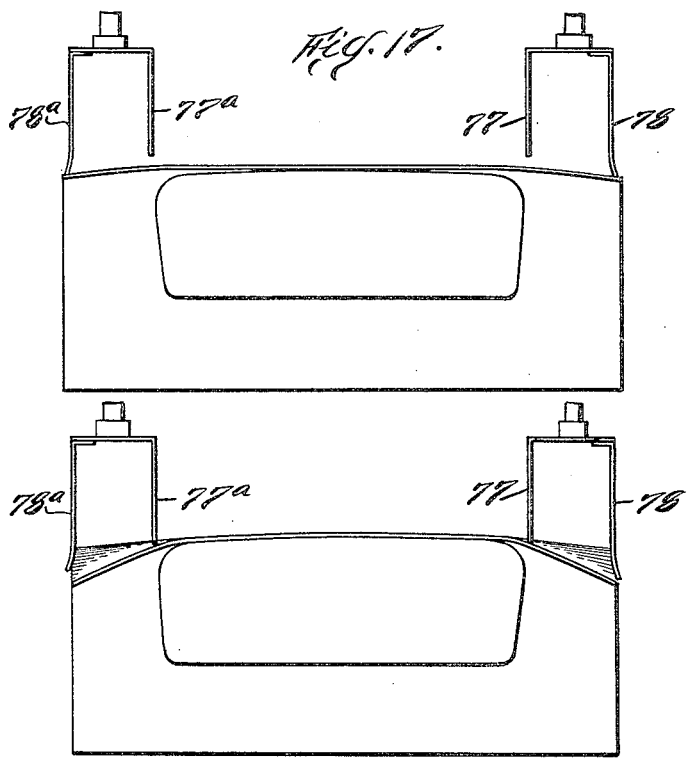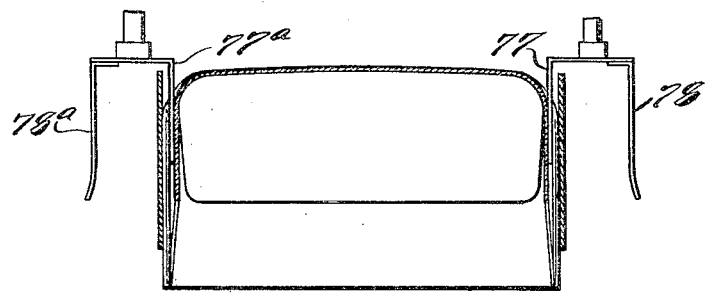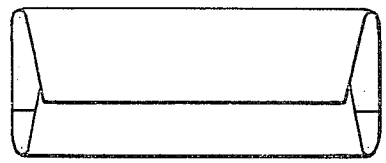

G. R. WARD.
BREAD WRAPPING MACHINE.
APPLICATION FILED MAR. 29, 1912.
1,094,614.
Patented Apr. 28, 1914.
12 SHEETS—SHEET 12.
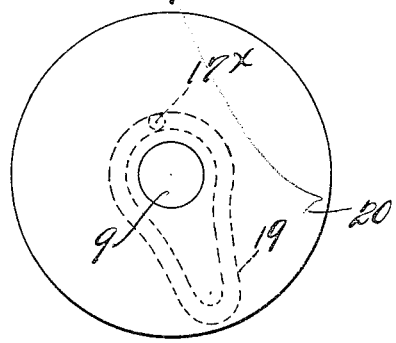
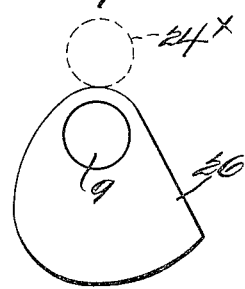
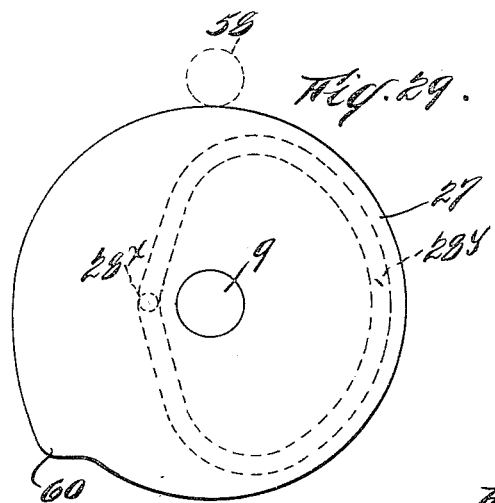
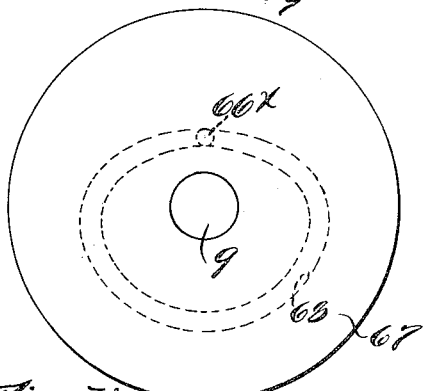
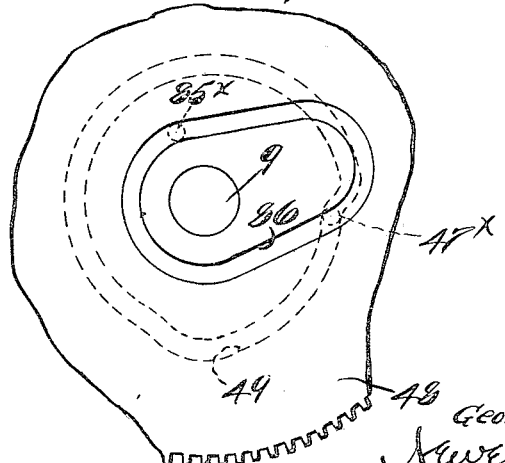
Witnesses:
S. A. Jarvis
A. Bernstein
Inventor
George R. Ward
by A. Wells & Cal.
attorneys.

UNITED STATES PATENT OFFICE.

GEORGE R. WARD, OF NEW YORK, N. Y., ASSIGNOR TO THE WRAPPING MACHINE COMPANY OF AMERICA, A CORPORATION OF NEW YORK.

BREAD-WRAPPING MACHINE.

1,094,614.   Specification of Letters Patent.   Patented Apr. 28, 1914.

Application filed March 29, 1912. Serial No. 687,174.

*To all whom it may concern:*

Be it known that I, GEORGE R. WARD, a citizen of the United States, residing at Hotel Calumet, West Fifty-seventh street, New York city, New York, have invented certain new and useful Improvements in Bread-Wrapping Machines, of which the following is a clear, full, and exact description.

This invention relates to a wrapping machine, particularly to a machine for wrapping bread, and the object is to improve in general the detail structure and combination of parts of such a machine for producing a bread-wrapping apparatus of superior efficiency and durability.

The main problem in bread-wrapping machines lies in the difficulty of providing an apparatus which will at the same time wrap the bread closely and also accommodate itself to loaves of different sizes and irregular shapes. A further consideration in the use of machines of this character is that of economy, and on this account it is desirable to use an extremely cheap wrapping material such as a very thin paper, preferably waxed. Consequently a machine for handling such paper must be differently designed than one for handling heavy wrapping paper and folding it about rigid articles of uniform size. The present machine therefore is preferably adapted to handle and wrap irregular loaves of bread with a thin wax paper of extreme lightness, and furthermore to wrap said paper in such a way that the folded flaps may be secured and sealed in the most efficient way.

My invention further consists in a compact design and distribution of the moving parts of my machine whereby unnecessary steps are eliminated and whereby the machine is evenly balanced so as to affect its operations with the least possible movement and thus make it possible for the machine to be speeded to a high degree of efficiency.

Further objects and advantages of my invention will become apparent from the following specific description, and the broad scope thereof will be embodied in the appended claims.

Figure 1:
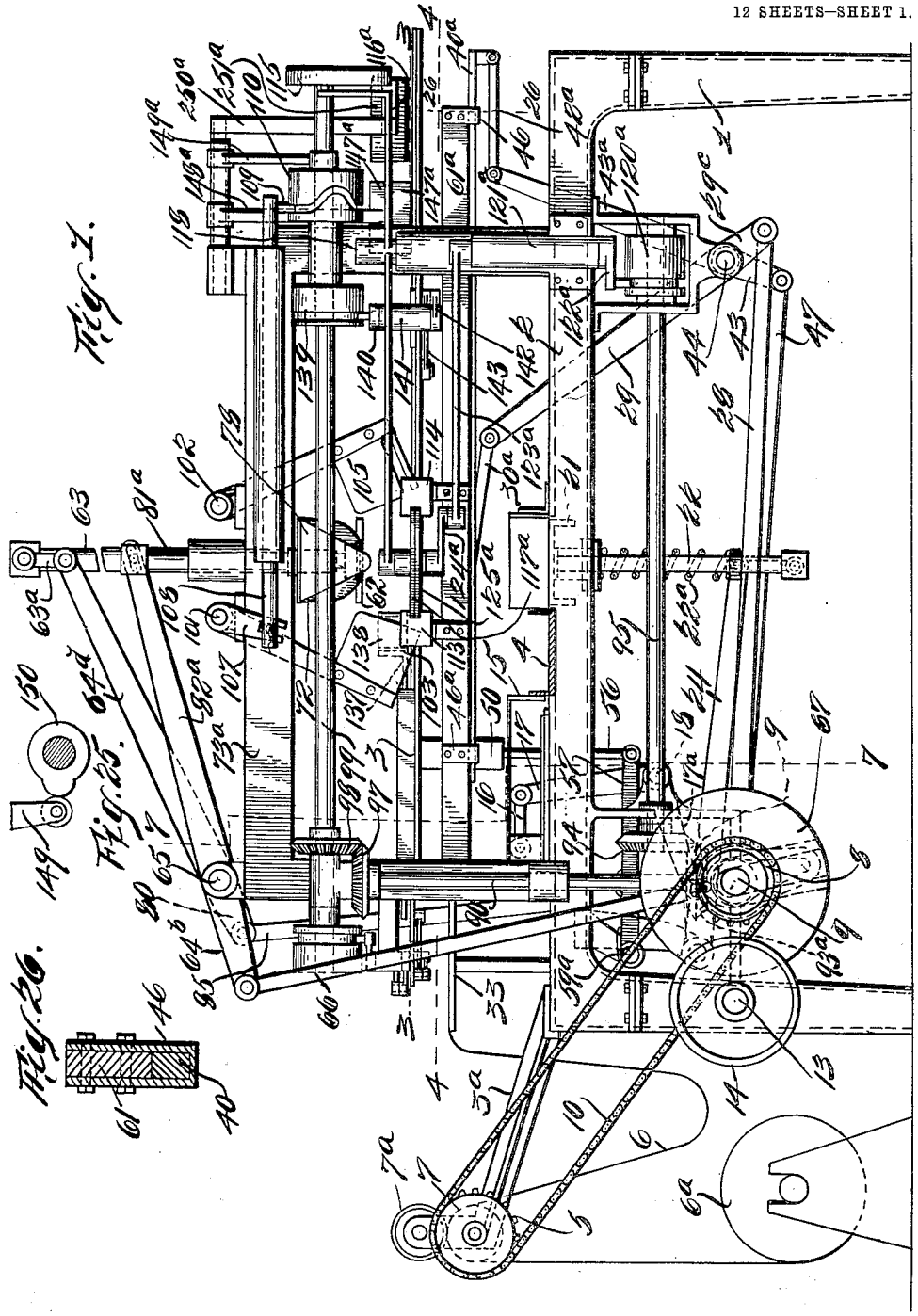
Figure 2:
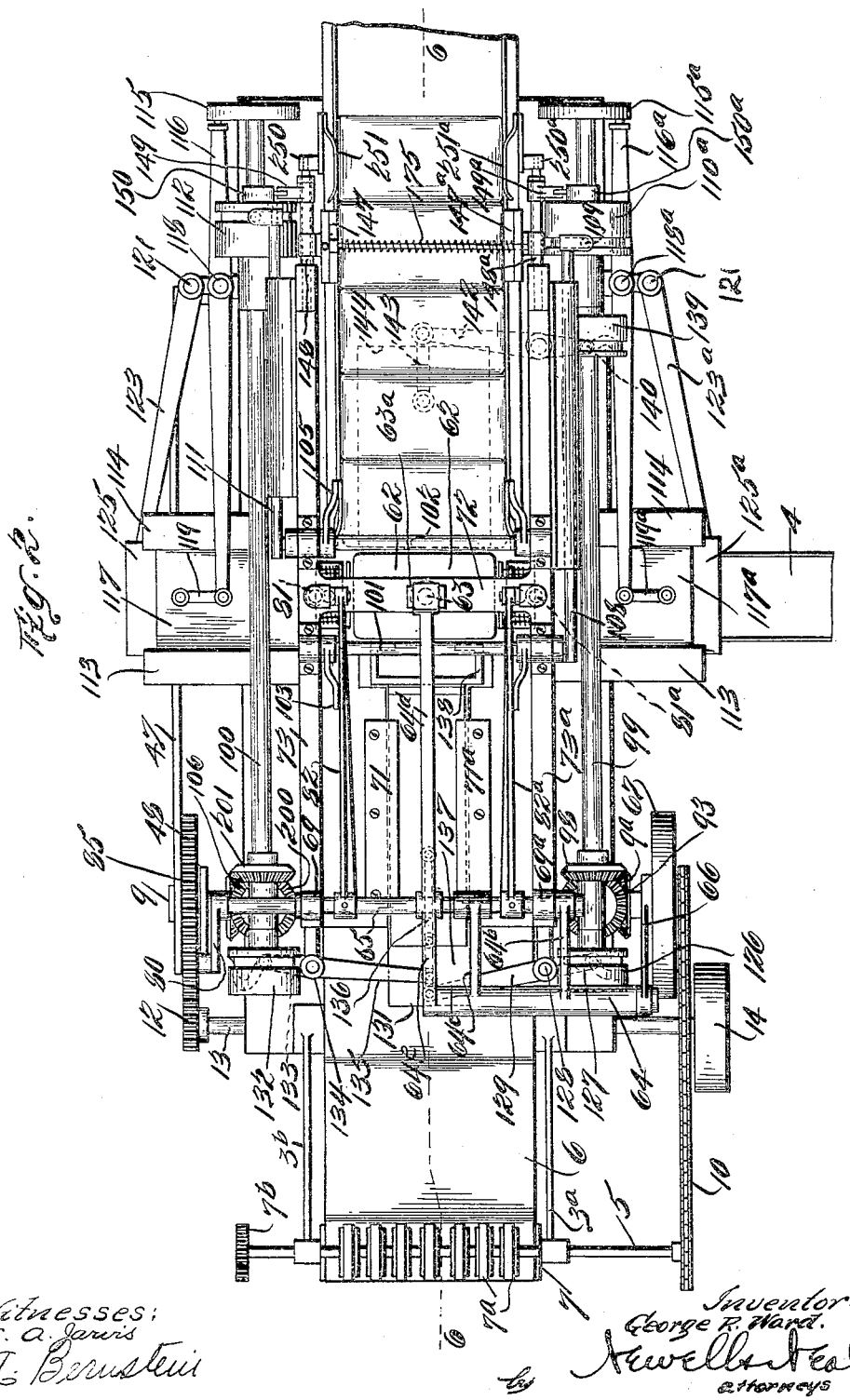
Figure 3:
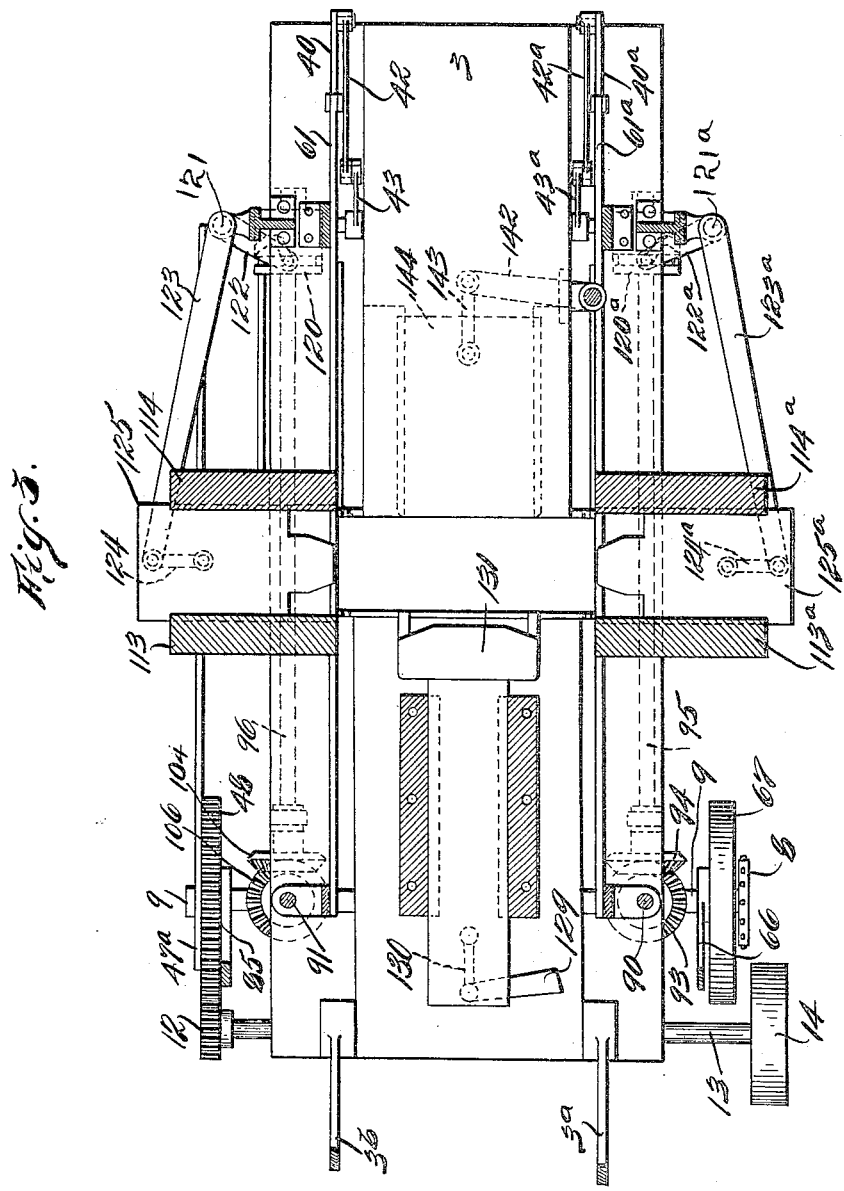
Figure 4:
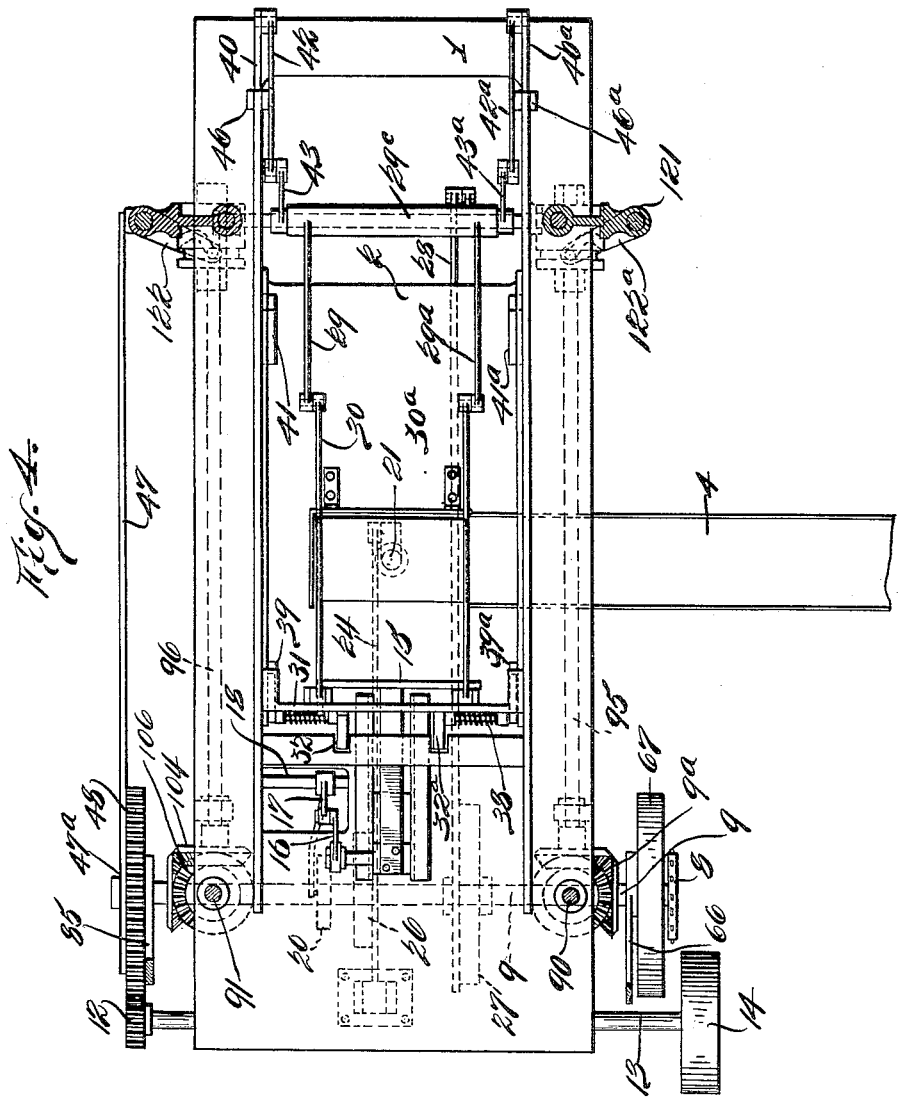
Figure 5:
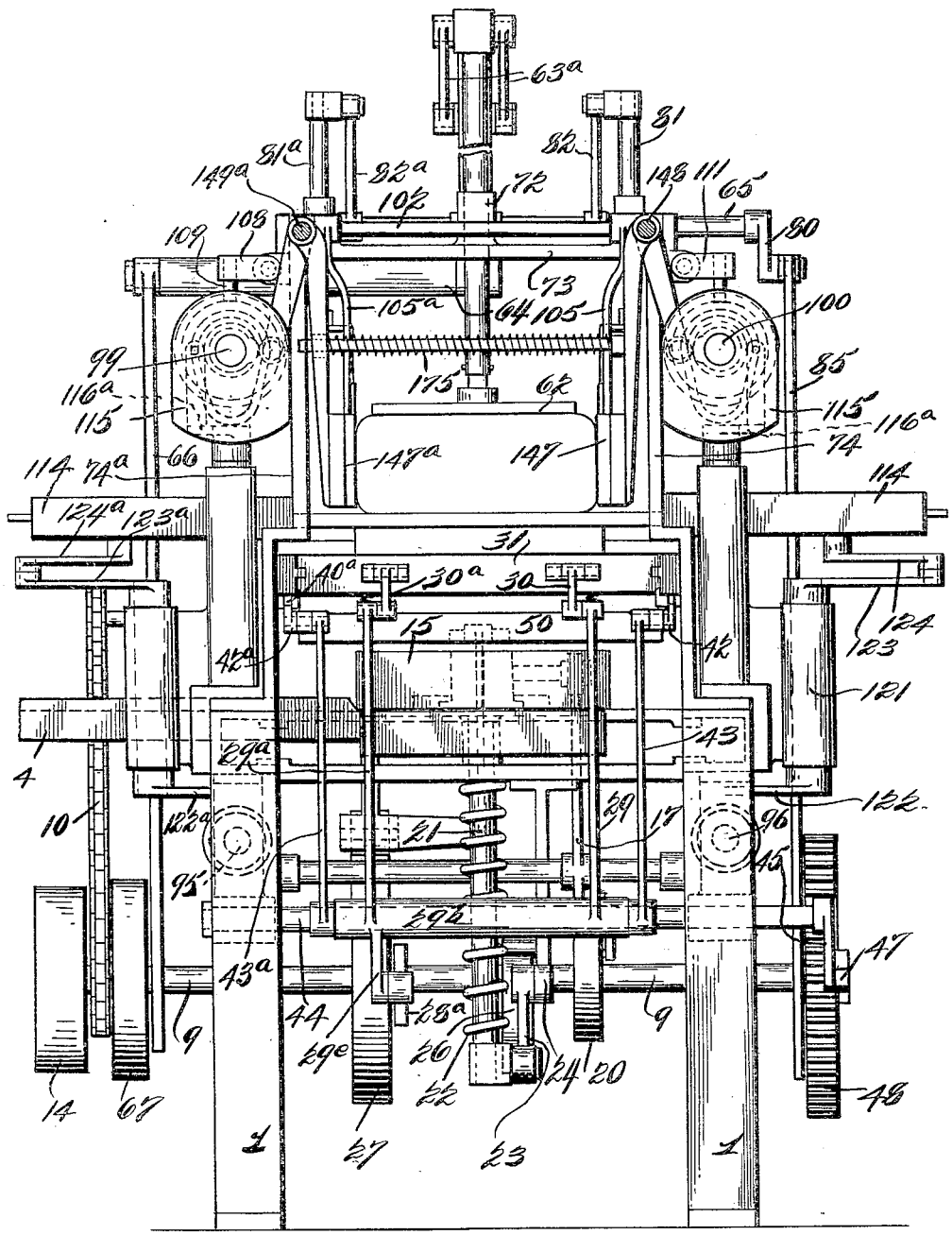

In the preferred embodiment of my invention shown in the drawings, Figure 1 is a side elevation of the entire machine; Fig. 2 is a plan of the same; Fig. 3 is a horizontal section through line 3—3 Fig. 1; Fig. 4 is a horizontal section through line 4—4 Fig. 1; Fig. 5 is an end elevation looking from the right of Fig. 1; Fig. 6 is a longitudinal section through line 6—6 Fig. 2; Fig. 7 is a vertical transverse section through line 7—7 of Fig. 1; Fig. 8 is a detail plan of a paper-gripper; Fig. 9 is a detail section of a heating shutter; Fig. 10 is a detail elevation of the cutting device through 10—10 Fig. 11; Fig. 11 is an enlarged detail of a paper-gripper and the cutting device, showing a section of the cutting device taken through line 11—11 Fig. 10; Figs. 12 and 13 are enlarged detail views of the corner end folders in different positions; Fig. 14 is a detail section of said folders in the position shown in Fig. 13; Fig. 15 is an enlarged detail of the bottom end folders in action; Fig. 16 is an enlarged detail of the spring-holding clamp; Figs. 17 to 24 inclusive are views showing the various steps of the wrapping operation; Fig. 25 is a detail of the heating shutter operating cam; Fig. 26 is a section through a side-supporting rail along line 26—26 of Fig. 1; Figs. 27 to 31 inclusive are views of the various operating cams.

Referring more particularly to the drawings the main frame or base of the machine is indicated by 1, and as shown comprises a lower horizontal platform 2, an upper platform 3, together with vertical standards 74 and top horizontal rails 73 and 73$^a$. Intermediate side rails 61 and 61$^a$ complete the main supporting elements of the machine, while at the rear are shown supporting brackets 3$^a$ and 3$^b$ which support at their outward ends let-off mechanism 7, 7$^a$ adapted to feed paper 6 from a supply roll 6$^a$.

At the lower rear part of the machine and extending transversely thereof is mounted a main cam and driving shaft 9. This shaft is driven through spur gears 48 and 12 from a counter-shaft 13, which in turn has belt pulley 14 thereon for receiving power from any convenient source. The cam shaft 9 drives, by means of sprockets 8, 5, and connecting chain 10, a friction roll 7, which in turn through meshed gears 7$^b$, 7$^c$, drives upper roll 7$^a$ for feeding the paper in a continuous web 6 into the machine. The web 6 is preferably fed fast enough to provide a loop as shown.

The articles to be wrapped such as loaves of bread, are preferably fed to the lower platform 2 of the machine along a side chute 4. Each loaf as it arrives at the center of this platform is thrust forward upon the head 21 of carrier or lower plunger 22 by means of a feed pusher 15. This feed pusher is slidably mounted on the lower platform 2 and reciprocated thereon by link and lever connections 16, 17 to cam 20 mounted on the main cam shaft 9. The link and lever connections consist more particularly, as shown in Figs. 1, 6 and 7, of the bell crank lever 17 pivoted at 18, having one arm connected by link 16 to the rear end of pusher slide 15 and the other arm 17$^a$ provided with a pin 17$^x$ traveling in a groove 19 of the cam 20. See Fig. 27.

Before the bread is carried upwardly upon plunger head 21, a wrapper is carried across the subsequent path of movement of the bread by the following mechanism. Slidably mounted in the side rails 61 and 61$^a$ by any suitable key connection is a crosshead 31 (see Figs. 6 and 11) upon which is carried, preferably two sets of paper-grippers 32, 32$^a$ respectively (see Fig. 4). Each paper-gripping device as shown in Figs. 8 and 11, consists of an upper stationary jaw 32 and a lower pivoted jaw 34 which is provided with a coil spring 38 tending to normally keep it closed upon the upper jaw and having a tail 35 adapted to engage with suitable wedges 39 for opening the grippers at the proper time. The cross-head 31 and the grippers carried thereby are caused to travel back and forth in their slides by means of connections controlled by cam groove 28$^y$ of cam 27 mounted on the main cam shaft 9. These connections comprise a cam rod 28 forked at 28$^a$ to embrace shaft 9, and having a pin 28$^x$ traveling in said cam groove 28$^y$ of cam 27 (see Figs. 1, 5, 6, 7 and 29). The outer end of rod 28 is connected to an arm 29$^c$ fixed to a sleeve 29$^b$ loosely mounted upon a shaft 44. The sleeve 29$^b$, as shown in Fig. 5, has extending upwardly from each end, arms 29 and 29$^a$, which in turn are connected to the crosshead 31 by links 30 and 30$^a$ respectively.

The means for opening and closing the paper-grippers at the proper times so that in their rearward position they will open to grip a wrapper and carry it along the machine to a forward position and there open, are as follows. Beneath each side rail 61 and 61$^a$ respectively is slidably mounted wedge carriers 40 and 40$^a$ respectively. Keepers or U-shaped straps 46 and 46$^a$ secured to the side rails 61 and 61$^a$ respectively provide the supporting bearings for the wedge carriers 40 and 40$^a$ (see Fig. 26). As shown in Fig. 6, each wedge carrier 40 has at separated points thereon wedges 39 and 41 with their inclines facing oppositely so as to actuate the paper-grippers at each end of their travel. As shown in Fig. 11, the wedge 39 moving relatively to the tail 35 of the paper-gripper, causes the same to open or close under the force of its spring 38, depending on the direction of relative movement. The movement of the wedge slides 40 and 40$^a$ is controlled by cam groove 49 upon one face of gear 48 through suitable connections, now to be described. A cam lever 47 having a forked end 47$^a$ embraces shaft 9 upon the outer face of gear 48 and has a pin 47$^x$ traveling in cam groove 49 of said gear face (see Fig. 31). The outer end of rod 47 is connected by crank 45 to shaft 44 mounted in bearings of the main frame. The shaft 44 has fixed thereto, one at each side of the main frame, arms 43 and 43$^a$, which in turn are connected to slides 40 and 40$^a$ through links 42 and 42$^a$. Wedges 39 and 39$^a$ are operated so as to open the paper-grippers previous to their arrival at the rear of the machine adjacent the cutting device, as shown in Fig. 11, and then immediately pass from under the tail 35 of said grippers so as to allow them to close upon the paper. Wedges 41 and 41$^a$ at the other end of the paper-gripper travel, likewise have a converse double movement, first opening the grippers to release the paper, and then allowing the same to close during their rearward travel for another sheet.

The mechanism for cutting the continuous web 6 into measured wrapper lengths comprises a knife head 50 carrying a knife 51 therein adapted to coöperate with groove knife block 55 (see Fig. 11). As shown also in Fig. 10, the knife head 50 preferably carries a yielding presser-block 54, which is slotted to allow the passage of the knife 51 therethrough and which is mounted on pins 52 sliding in sockets of head 50. Coil springs 53 embracing rods 52 normally keep the presser block in its outward position. The function of this presser-block is to engage the paper and securely hold it against the opposed knife block 55 during the cutting of the paper, whereby an even uniform cut is obtained. Moreover lower plunger head 21 and upper plunger head 63 are preferably operated as will be described to clamp the bread and interposed wrapper firmly during the action of the cutting knife 51. Tension springs 37, 37$^a$, mounted on support 36 and adapted to bear frictionally upon the paper during its travel may also be provided if desired for checking the overtravel of said paper. A paper guide consisting of a plate 33 secured to the main frame is provided for guiding the paper in its travel from the supply roll to the cutting mechanism and grippers. The knife head 50 is given its reciprocating vertical movemnt from the peripheral cam edge 60 of cam 27 mounted on the main shaft 9 (see Figs. 6 and 22). A cam lever 57 pivoted at 59 on the main frame has a roll 58 in contact with the periphery 60 of cam 27, and at its outer end is connected by a link 56 to the knife head 50. A coiled spring 59$^a$ tends to keep said lever 57 down and roll 58 in contact with cam edge 60 (see Figs. 1, 6 and 7).

As the wrapping paper is brought to position above the lower plunger-head 21, this plunger 22 is raised to carry the bread and wrapper through orifice 75 of the upper platform 3, and said lower plunger 22 is reciprocated as follows. A cam lever 24 is pivoted at 25 upon the main frame and carries the roller 24$^x$ bearing on cam 26 mounted on main cam shaft 9 (see Figs. 5, 7 and 28). The outer end of lever 24 is connected by link 23 with plunger rod 22. A coil spring 22$^a$ surrounding said rod tends to keep the same in its lower position and the roll 24$^x$ in contact with its cam surface.

Coöperating with the head 21 of bottom plunger 22 is a head 62 yieldingly mounted in a top plunger 63 which is vertically reciprocated so as to press the wrapper against the top of the bread and keep it in contact therewith during the upward travel of said bread and wrapper through the orifice of upper platform 3. Head 62 has a stem 274 within a socket of plunger 63 and is normally and yieldingly held outwardly by spring 275. The top plunger rod 63 has bearings in a transverse top piece 72 secured to the upper rails 73 and 73$^a$. The plunger 63 is given its vertical movement from cam groove 68 (see Fig. 30) on cam 67 mounted on the main cam shaft 9 by means of the following connections. A cam rod 66 is forked at its lower end to embrace the shaft 9, and has a pin 66$^x$ traveling in groove 68 of said cam 67. The upper end of the rod 66 is connected to a swinging bracket 64 having arms 64$^b$, 64$^c$ and 64$^e$, embracing and loosely mounted upon shaft 65. Arm 64$^e$ of the bracket is extended into arm 64$^d$, which in turn is connected by a link 63$^a$ to the upper end of plunger rod 63.

The upper platform 3 has a centrally-disposed orifice in line with the plunger heads 21 and 62, which orifice has side walls 75 adapted to turn side portions of the wrapper downwardly against the sides of the bread when the same is carried therethrough, as shown in dotted lines in Fig. 12. Leaf springs 76 are also preferably mounted upon the side walls 75 so as to frictionally engage the side of the wrapper and cause them to hug closely the sides of the bread during the travel therethrough and yet yield readily to any irregularities of different loaves.

The next operation is to fold down end portions of the wrapper against the ends of the article, and this is accomplished by means of vertically reciprocated end folding blades 77, 78, 77$^a$, 78$^a$. These end folding blades are moved simultaneously against the ends of the article, as shown in Figs. 15 and 17, and are controlled from cam groove 86 upon the inner face of gear 48 (see Fig. 31) by the following mechanism: A cam rod 85 has a lower forked end with a pin 85$^x$ engaging groove 86, and its upper end is connected to a crank 80 fixed to the shaft 65 mounted in bearings of the main frame. Also fixed to this shaft 65, one at each side of the machine, are arms 82 and 82$^a$ which have a pin and slot connection at their outer ends with the supports 81 and 81$^a$ of their respective end folding blades. The supports 81 and 81$^a$ have sliding bearings through the top cross-piece 72 as shown in Fig. 2. Each end folder, as shown more clearly in Figs. 15 and 17, consists of a pair of spaced blades such as 77 and 78. The outer blade 78 is preferably a little longer than the inner blade 77 so that it engages the outer end portion of the wrapper slightly before the inner portion is engaged, and therefore turns down the outer portion and starts the fold before the inner blade 77 strikes the paper. This action tends to lead the fold properly, and is particularly desirable with a thin flimsy wrapper.

Mounted in bearings at each side of the machine and extending longitudinally thereof are upper and lower horizontal cam shafts 99, 95, 100, 96. The cam shafts 95 and 99 are driven from a vertical driving shaft 90 by means of beveled gears 93, 94, 97 and 98 respectively, as shown in Figs. 1 and 7. The vertical shaft 90 is driven from the main cam shaft 9 by beveled gears 93$^a$ and 9$^a$. Similarly at the other side of the machine a vertical shaft 91 driven by beveled gears 106$^a$ and 9$^b$ have connections to lower horizontal shaft 96 through beveled gears 104 and 106 (see Fig. 7), and connections to the upper horizontal shaft through beveled gears 200 and 201. The horizontal cam shafts thus symmetrically disposed on each side of the machine furnish controlling means whereby the different folding blades may be easily and efficiently operated with simple and direct connections.

After the end folds have been made and preferably while the end folding blades 77 and 77$^a$ are in their engaging position as shown in Fig. 19, the corner folds are made. It should be here remarked that when the sides and ends of the wrapper, as heretofore described, are both folded down against the article, cocked portions of the wrapper are left outstanding from the corner edges of the bread, and in order to make a neat and secure end wrapping, these cocked portions should be folded against the ends of the article, preferably one over the other as shown in Figs. 14 and 20, and also at a high point upon the end of the article so as to bring their overlapping ends as square with one another as possible. In order to accomplish this I preferably fold these cocked corner portions of the wrapper by swinging the same as squarely as possible around the corner edge of the article as a pivot, and by means acting transversely across rather than lengthwise of these corner edges, which means in the present embodiment preferably consists of swinging folding blades 103, 105 traveling across the end of the article. These blades are preferably made wider than the width of the bread so as to engage that portion of the wrapper extending below the bread bottom, (Figs. 12 and 13). One of the blades 105 is slotted as shown in Fig. 12 to provide an opening for an end supporting clamp hereinafter to be described. In this way a better control of the swinging corner fold is obtained. Since both ends of the bread are wrapped simultaneously, folding blade 103 is connected to a similar folding blade 103$^a$ at the other side of the machine by means of a transverse shaft 101, and similarly folding blade 105 is connected with a blade 105$^a$ by means of shaft 102. Of course the folding blades 103 and 105 act consecutively for overlapping one corner of the wrapper on top of the other as shown in Fig. 20, and consequently, one blade such as 105 is slightly offset as shown in Fig. 14 to overlap its coöperating blade. The end folders 103 and 103$^a$, together with their shaft 101, are rocked from an arm 107 fixed to said shaft at one end thereof (see Fig. 1) from a slide rod 108 having a pin 109 engaging a groove of the barrel cam 110 fixed to upper horizontal shaft 99. Similarly blades 105, 105$^a$ are rocked with their shaft 102 by connection with slide rod 111, which rod has a pin engaging a groove of barrel cam 112 mounted upon upper horizontal cam shaft 100 at the other side of the machine (see Fig. 2).

The bread loaf having been wrapped to the condition shown in Fig. 20, and being located with its bottom in line with the upper surface of platform 3, the plunger support 21 is withdrawn in order to make the bottom folds upon the under-side of the bread loaf. Previously, however, to the withdrawal of the plunger support, clamps 117 and 117$^a$ traveling from each side of the machine engage the ends of the wrapped bread, as shown in Fig. 15 and support it during the subsequent folding operations. The clamps 117 and 117$^a$ are slidably mounted in transverse guideways 113 and 114 of the machine (see Fig. 1) and are operated by means of horizontal levers 116 and 116$^a$ pivoted at 118 and 118$^a$ respectively, controlled by face cams 115 and 115$^a$. The outer ends of links 116 and 116$^a$ are connected by links 119 and 119$^a$ to the slide clamps 117 and 117$^a$ respectively, as shown in Fig. 2. The clamps 117 and 117$^a$ comprise yieldingly mounted contact faces 117$^d$, 117$^e$, each mounted as shown on a stem slidable in brackets 117$^b$ and held forward by spring 117$^c$.

Directly beneath the slide clamps, and also sliding in the guideways 113 and 114, are the horizontal end folders 125 and 125$^a$ (see Fig. 3), which operate to tuck end portions of the wrapper beneath the article as shown in Fig. 15. Folding blades 125 and 125$^a$ are operated by horizontally swinging levers 123, 123$^a$, respectively, which are connected to the blades by links 124 and 124$^a$ and which levers also have a pivotal bearing in vertical sleeves 121 and 121$^a$. The lower ends 122, 122$^a$ of said levers (see Fig. 1) have pins engaging grooves of cams 120 and 120$^a$ mounted upon the lower horizontal cam shafts 96 and 95. It will be observed more particularly from Fig. 15 that the folding blades 125, 125$^a$ pass beneath the bread in close contact with the lower edges of the clamp faces 117$^d$, 117$^e$. In this way the clamps act to retain the under folds in place and prevent any tendency of the wrapper to follow the blades 125, 125$^a$ upon their withdrawal.

The next operations upon the wrapper are performed by horizontal sliding blades 131 and 144 which fold up the remaining side portions of the wrapper in successive flaps upon the bottom of the wrapped bread. It will be here noted that these side flaps constitute the final finishing folds of the wrapper and serve to confine the remaining folds which have been tucked beneath the article, securely in place. As will be later described, these last flaps are sealed together to secure the entire wrapper in place upon the bread.

Blade 131 is actuated, as shown in Fig. 3, from a lever 129 connected thereto by link 130, said lever being pivoted at 128 (see Fig. 2) and having its other end 127 provided with a pin engaging a slot of a barrel cam 126 fixed to the rear end of upper horizontal shaft 99 (see Fig. 1). Folding blade 144 is actuated from lever 142 connected thereto by link 143, said lever being pivoted at 141 (see Fig. 1) and having its other end 140 provided with a pin engaging groove of barrel cam 139, fixed to upper horizontal cam shaft 99. The folding blade 131 is preferably actuated before blade 144 as shown in Fig. 22, to fold against the bottom its side flap, while the folding blade 144 is actuated to start the fold of the last flap just prior to the expulsion of the wrapped bread from its position over orifice 75. The turning up of the last flap by blade 144 just prior to the movement of the wrapped bread along the bread platform acts to lock the next to the last flap and prevent its being opened out by being frictionally driven along the top of the platform in the direction shown by arrow in Figs. 22 and 23.

The bread being now completely wrapped, it is ejected from between the supporting clamps 117 and 117$^a$ by delivery pusher 138 as shown in Fig. 23. The delivery pusher 138 is carried on a slide 137 mounted directly above folding blade 131, and said slide is actuated by a lever 135 connected thereto by link 136 (see Figs. 6 and 7). Lever 135 is pivotally mounted in a bearing 134, and has an end 133 provided with a pin engaging groove in barrel cam 132, fixed to the rear end of the upper horizontal shaft 100. The wrapped loaves of bread are thus delivered successively and in contact along upper platform 3, as shown in Fig. 2, and the forward end of the platform 3 is provided with a heating plate 145, shown clearly in Fig. 6, which acts by melting the waxed or other previously prepared paper, to seal the under flaps of the wrapped articles as they rub along in contact therewith. The plates 145 may be heated in any suitable manner, as by means of gas jets 146 shown in Fig. 6. It should be here noted that the under-side of bread is often irregular or concave in shape due to shrinkage, and that by first tucking end portions of the wrapper beneath the article and finally overlapping the side portions thereon, the last two side flaps are thus sealed to each other and the space between them and the bottom of the bread is stuffed by the tucked-under end portions. It will also be observed that the present machine is designed to handle the bread loaf during the wrapping operations entirely upon this bottom side, a great advantage in the operation of such machines, since this is usually the only regular side of a bread loaf.

Usually the sealing of the bottom flaps is sufficient to secure the wrapper in place, but I have also provided additional means which may be employed, if desired, for sealing as well, the end folds of the wrapper upon each other to more securely bind the same upon the loaf. Such means are provided by swinging heating shutters 147 and 147$^a$ (see Figs. 1 and 6), which may be heated in any suitable way, as by electricity as shown in Fig. 9, and heating shutters are supported from shafts 148, 148$^a$ rocking on the main frame. Arms 149, 149$^a$ extending from these shafts have rollers engaging operating cams 150, 150$^a$, in turn fixed to upper horizontal cam shafts 100 and 99, respectively. The cams 150, 150$^a$ close the heating shutters upon the loaves while a spring 175 is provided to separate said shutters. In this way the end flaps are sealed by both pressure and heat. Beyond the heating shutters are mounted on fixed arms 250, 250$^a$ leaf springs 251, 251$^a$, which are adapted to bear with yielding pressure upon the ends of the wrapped package as it passes therethrough so as to more effectually seal said ends.

Recounting briefly the several operations of the machine as described, the bread and wrapper are first fed between the vertically reciprocating plungers and while firmly clamped between said plunger heads the wrapper sheet is severed. The loaf with the wrapper above it is then carried from the lower platform to the upper platform, whereby side portions of the wrapper are folded downwardly against the loaf as shown in Fig. 12. Vertical end folders then descend at each end of the loaf shown in Figs. 17, 18, and fold end portions of the wrapper against the loaf. Before these end folders are withdrawn, Fig. 19, swinging corner folders, (Figs. 12, 13), two at each end of the article, act successively (Fig. 14) in turning over the outstanding corners of the wrapper upon the end of the article, as shown in Figs. 19 and 20. Next end clamps support the loaf while horizontally movable end folders tuck the lower end portions of the wrapper beneath the article, as shown in Fig. 15. The final wrapping operations then take place by folding depending side portions of the wrapper in successive flaps on the bottom of the article as shown in Figs. 21 and 22. The wrapped article is then pushed along the surface of upper platform 3 as shown in Fig. 23, and passes along this platform whereby the end and bottom flaps are securely sealed by the heating means described.

What I claim is:—

1. In a wrapping machine in combination, means for supplying a wrapper to an article to be wrapped, means for folding said wrapper against the sides and ends of said article with cocked portions outstanding from the corner edges of said article, movable folding blades acting upon said cocked portions transversely of said corner edges to fold the same against the ends of said article, means for maintaining said article in the position in which said folding means have completed their action, and means for folding the remaining side and end portions of said wrapper beneath said article while said article is in said position.

2. In a wrapping machine in combination, means for supplying a wrapper to an article to be wrapped, means for folding said wrapper against the sides and ends of said article with cocked portions outstanding from the corner edges of said article, movable folding blades acting upon said cocked portions transversely of said corner edges to fold the same against the ends of said article, means for tucking end portions of said wrapper beneath said article in the same position in which said folding blades act on said wrapper, and means for folding side portions of said wrapper in successive flaps upon the bottom of said article and over said tucked-under end portions.

3. In a wrapping machine in combination, means for supplying a wrapper to an article to be wrapped, means for simultaneously folding said wrapper against opposite sides of said article, movable folding blades for folding said wrapper against opposite ends of said article with cocked portions outstanding from the corner edges of said articles, movable folding blades acting upon said cocked portions transversely of said corner edges to fold the same against the ends of said article, means for tucking end portions of said wrapper beneath said article in the same position in which said folding blades act on said wrapper, means for folding side portions of said wrapper in successive flaps upon the bottom of said article and over said tucked-under end portions.

4. In a wrapping machine in combination, means for bringing an article and wrapper in juxtaposition, comprising a movable carrier for said article, and wrapper feed devices moving across the path of said movable carrier, means for folding said wrapper against the sides and ends of said article with cocked portions outstanding from the corner edges of said article, movable folding blades acting upon the cocked portions transversely of said corner edges to fold the same against the ends of said article, means for tucking end portions of said wrapper beneath said article without changing the direction of movement of said article, and means for folding side portions of said wrapper in successive flaps upon the bottom of said article and over said tucked-under end portions.

5. In a wrapping machine in combination, means for bringing an article and wrapper in juxtaposition, comprising wrapper feed devices moving past said article, a movable carrier for supporting said article, an oppositely-located presser head for keeping said wrapper and article in contact during subsequent folding operations, means for folding said wrapper against the sides and ends of said article, with cocked portions outstanding from the corner edges thereof, positively movable folding blades acting upon said cocked portions transversely of said corner edges to fold the same against the ends of said article, means for tucking end portions of said wrapper beneath said article, and means for folding side portions of said wrapper in successive flaps upon the bottom of said article and over said tucked-under end portions.

6. In a wrapping machine in combination, means for bringing an article and wrapper in juxtaposition, comprising a movable carrier for said article, and wrapper-feed devices moving across the path of movement of said carrier, means for folding said wrapper against the sides and ends of said article, with cocked portions outstanding from the corner edges thereof, movable folding blades acting upon said cocked portions transversely of said corner edges to fold the same against the ends of said article, clamping devices for supporting said article while said carrier is withdrawn during subsequent folding operations, means for tucking end portions of said wrapper beneath said article, and means for folding side portions of said wrapper in successive flaps upon the bottom of said article and over said tucked-under end portions.

7. In a wrapping machine in combination, means for supplying a wrapper to an article to be wrapped, means for simultaneously folding said wrapper against opposite sides of said article, means for later folding said wrapper against opposite ends of said article simultaneously, comprising separated engaging portions adapted to strike said wrapper at points both spaced from and adjacent to the folding line thereof, and means for folding the remaining side and end portions of said wrapper beneath said article while said article is in the same position in which the wrapper is folded against opposite ends thereof.

8. In a wrapping machine in combination, a main frame comprising a supply platform to which unwrapped articles are fed and a delivery platform spaced therefrom from which wrapped articles are delivered, means for feeding a wrapper to each article, a movable carrier for transferring articles from the supply platform to the delivery platform, said delivery platform having an orifice through which an article and wrapper are adapted to be passed and having side walls adapted to fold the wrapper against the sides of the article when moved therethrough, means for later folding said wrapper against opposite ends of said article with cocked portions outstanding from the corner edges of said article, movable folding blades acting upon said cocked portions transversely of said corner edges to fold the same against the ends of said article, means for tucking end portions of said wrapper beneath said article, means for folding side portions of said wrapper in successive flaps upon the bottom of said article and over said tucked-under end portions.

9. In a wrapping machine in combination, a main frame comprising a supply platform to which unwrapped articles are fed and a delivery platform spaced therefrom from which wrapped articles are delivered, means for feeding a wrapper to each article, a movable carrier for transferring articles from the supply platform to the delivery platform, said delivery platform having an orifice through which an article and wrapper are adapted to be passed, and having side walls adapted to fold the wrapper against the sides of the article when moved therethrough, vertically movable end blades for simultaneously folding portions of said wrapper against the ends of the article, with cocked portions outstanding from the corner edges of said article, vertically-disposed corner blades movable transversely of said corner edges for folding the cocked portions of said wrapper against the ends of the article, horizontally moving end blades for tucking end portions of said wrapper beneath said article, horizontally moving side blades for folding side portions of said wrapper in successive flaps upon the bottom of the article, and a pusher for successively delivering said articles in contact along said delivery platform.

10. In a wrapping machine in combination, a main frame comprising a supply platform to which unwrapped articles are fed and a delivery platform spaced therefrom from which wrapped articles are delivered, means for feeding a wrapper to each article, a movable carrier for transferring articles from the supply platform to the delivery platform, said delivery platform having an orifice through which an article and wrapper are adapted to be passed, and having side walls adapted to fold the wrapper against the sides of the article when moved therethrough, vertically movable end blades for simultaneously folding portions of said wrapper against the ends of the article, with cocked portions outstanding from the corner edges of said article, vertically-disposed corner blades movable transversely of said corner edges for folding the cocked portions of said wrapper against the ends of the article, horizontally moving end blades for tucking end portions of said wrapper beneath said article, and horizontally moving side blades for folding side portions of said wrapper in successive flaps upon the bottom of the article.

11. In a wrapping machine in combination, a main frame comprising a lower stationary supply platform to which unwrapped articles are fed, an upper parallel delivery platform from which said articles are delivered, means for feeding a wrapper to each article, coöperating upper and lower vertically moving plungers for transferring articles from the supply platform to the delivery platform, said delivery platform having an orifice through which said article and wrapper are adapted to be passed, and having side walls adapted to fold the wrapper against the sides of the article when moved therethrough, means for folding the wrapper around the ends and bottom of said article while said article is in one position, and means for delivering said wrapped articles successively and in contact along said delivery platform.

12. In a wrapping machine in combination, a main frame comprising a supply platform to which unwrapped articles are fed and a delivery platform spaced therefrom from which wrapped articles are delivered, means for feeding a wrapper to each article, a movable carrier for transferring articles from the supply platform to the delivery platform, said delivery platform having an orifice through which an article and wrapper are adapted to be passed and having side walls adapted to fold the wrapper against the sides of the article when moved therethrough, means for folding the wrapper around the ends and bottom of said article, means for delivering said wrapped articles successively and in contact along said delivery platform, and heating plates on said delivery platform against which said folding end flaps are adapted to contact when said articles are being delivered.

13. In a wrapping machine in combination, a main frame comprising a supply platform to which unwrapped articles are fed and a delivery platform spaced therefrom from which wrapped articles are delivered, means for feeding a wrapper to each article, a movable carrier for transferring articles from the supply platform to the delivery platform, said delivery platform having an orifice through which an article and wrapper are adapted to be passed, and having side walls adapted to fold the wrapper against the sides of the article when moved therethrough, means for simultaneously folding portions of said wrapper against the ends of the article comprising a pair of spaced end blades at each end of the article for acting upon each end portion of the wrapper, the outer blades of each pair depending below the inner blades for contacting first with the outer end portions of said wrapper during said folding action, and means for folding the remaining side and end portions of said wrapper beneath said article.

14. In a wrapping machine in combination, a main frame comprising a supply platform to which unwrapped articles are fed and a delivery platform spaced therefrom from which wrapped articles are delivered, means for feeding a wrapper to each article, a movable carrier for transferring articles from the supply platform to the delivery platform, said delivery platform having an orifice through which an article and wrapper are adapted to be passed, and having side walls adapted to fold the wrapper against the sides of the article when moved therethrough, means for simultaneously folding portions of said wrapper against the ends of the article comprising a pair of spaced end blades at each end of the article for acting upon each end portion of the wrapper, the outer blades of each pair depending below the inner blades for contacting first with the outer end portions of said wrapper during said folding action, with cocked portions outstanding from the corner edges of said article, vertically-disposed corner blades movable transversely of said corner edges for folding cocked portions of said wrapper against the ends of said article, horizontally moving end blades for tucking end portions of said wrapper beneath said article, horizontally moving side blades for folding side portions of said wrapper in successive flaps upon the bottom of said article.

15. In a wrapping machine in combination, a main supporting frame, movable folding blades mounted on said frame for wrapping an article, cam-operated mechanism for actuating said blades comprising a main cam shaft extending transversely of said frame, upper and lower cam shafts extending longitudinally of said frame at each side thereof, means for driving said longitudinal cam shafts from said main cam shaft, and connections from said cam shafts to said movable folding blades for operating the same.

16. In a wrapping machine in combination, a main supporting frame comprising a lower horizontal platform to which unwrapped articles are fed, an upper parallel platform from which said wrapped articles are delivered, a vertically reciprocating plunger located centrally of said main frame for elevating articles from said lower to said upper table, movable folding blades mounted on said frame adapted to fold said wrapper against said article, cam-operated mechanism for actuating said blades, comprising a main cam shaft for operating said plunger and extending transversely of said frame, upper and lower cam shafts extending longitudinally of said frame at each side thereof, means for driving said longitudinal cam shafts from said main cam shaft, and connections from said cam shafts to said movable folding blades for operating the same.

17. In a wrapping machine in combination, means for applying a wrapper against one surface of an article, means for folding said wrapper against four other surfaces of said article to leave cocked corner wrapper portions, means acting on said cocked portions transversely of the corner edges of said article, means for maintaining said partially wrapped article in the same position as that in which said folding means had acted on said wrapper, and means for folding the remaining portions of said wrapper against the other or sixth surface of said article while said article is in said position.

18. In a wrapping machine in combination, means for applying a wrapper against one surface of an article, means for moving said article vertically and for folding said wrapper against four other surfaces of said article to leave cocked corner wrapper portions, means acting on said cocked portions transversely of the corner edges of said article, means for maintaining said partially wrapped article in the same vertically shifted position as that in which said folding means had acted on said wrapper, and means for folding the remaining portions of said wrapper against the other or sixth surface of said article while said article is in said position.

19. In a wrapping machine in combination, means for applying a wrapper to one surface of an article to be wrapped, means for conveying said article and wrapper in one direction of movement from unwrapped to completely wrapped position, and means for positively and completely wrapping said article in said one direction of movement by folding the wrapper onto opposite surfaces of the article and onto the single remaining surface of said article in one position of said article, said latter means comprising a platform having an orifice through which said article and wrapper are conveyed, whereby the article is partially wrapped, and means at the upper end of said orifice for finishing the wrapping of the remaining opposite side surfaces of said article and the wrapping of the single remaining surface of said article while said article is at the said upper end of said orifice.

20. In a bread-wrapping machine, in combination, means for bringing a wrapper across the top of a loaf of bread to be wrapped, means for first folding said wrapper about the top, sides and ends of said loaf with depending portions extending below the bottom of said loaf and outwardly cocked portions at the corner edges of said loaf, movable folding blades then acting upon the cocked portions transversely of said corner edges to fold the same against the ends of the loaf, a receiving table for the wrapped loaves, and means for finally folding the depending portions of said wrapper against the bottom of said loaf and delivering said wrapped loaf to said table with its bottom side down.

21. In a bread wrapping machine in combination, means for bringing a wrapper across the top of a loaf of bread to be wrapped, means for folding said wrapper about the top, sides and ends of said loaf with depending portions extending below the bottom of said loaf and cocked portions at the corner edges of said loaf, movable folding blades at each side of said loaf, means to actuate said folding blades from opposite directions to fold the cocked corner portions of said wrapper against the ends of the loaf, and means for finally folding the depending portions of said wrapper against the bottom of said loaf.

22. In a bread wrapping machine in combination, means for bringing a wrapper across the top of a loaf of bread to be wrapped, means for folding said wrapper about the top, sides and ends of said loaf with depending portions extending below the bottom of said loaf and cocked portions at the corner edges of said loaf, movable folding blades, means to actuate the same for folding the cocked corner portions of said wrapper against the ends of the loaf, a receiving table for the wrapped loaves, and means for finally folding the depending portions of said wrapper against the bottom of said loaf and delivering said wrapped loaf to said receiving table with its bottom side down.

Signed at New York city, New York, this 23" day of March, 1912.

GEORGE R. WARD.

Witnesses:
 BEATRICE MIRVIS,
 A. BERNSTEIN.

Copies of this patent may be obtained for five cents each, by addressing the "Commissioner of Patents, Washington, D. C."